US012530244B2

(12) United States Patent
Martinez Andrade et al.

(10) Patent No.: US 12,530,244 B2
(45) Date of Patent: Jan. 20, 2026

(54) WEB-BASED WORKLOAD MANAGEMENT WITH ASYNCHRONOUS WORKLOAD EXECUTION AND REAL-TIME USER FEEDBACK

(71) Applicant: Microsoft Technology Licensing, LLC, Redmond, WA (US)

(72) Inventors: Andres Martinez Andrade, Mercer Island, WA (US); Kishore Kumar Penugonda, Bellevue, WA (US); Yanli Tong, Bellevue, WA (US); Ganapathi Sadasivam, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 674 days.

(21) Appl. No.: 17/955,826

(22) Filed: Sep. 29, 2022

(65) Prior Publication Data

US 2024/0111605 A1 Apr. 4, 2024

(51) Int. Cl.
*G06F 9/50* (2006.01)
*G06F 11/32* (2006.01)

(52) U.S. Cl.
CPC ............ *G06F 9/5083* (2013.01); *G06F 9/505* (2013.01); *G06F 11/324* (2013.01)

(58) Field of Classification Search
CPC ...... G06F 9/5083; G06F 9/505; G06F 11/324; G06F 2209/541; G06F 9/542; G06F 2209/509; G06F 9/5027
See application file for complete search history.

(56) References Cited

U.S. PATENT DOCUMENTS

| 8,751,281 | B2 | 6/2014 | Chaushev |
| 11,361,329 | B2 | 6/2022 | Moustafa et al. |
| 11,379,686 | B2 | 7/2022 | Coven et al. |
| 2008/0295119 | A1* | 11/2008 | Muscarella ........... G06F 9/4843 719/330 |
| 2017/0279859 | A1* | 9/2017 | Pogorelik ........... G06F 3/04817 |
| 2018/0239749 | A1* | 8/2018 | Zusman ............... G06F 9/4843 |
| 2021/0173718 | A1 | 6/2021 | Patel et al. |

(Continued)

OTHER PUBLICATIONS

"International Search Report and Written Opinion Issued in PCT Application No. PCT/US23/030991", Mailed Date: Oct. 18, 2023, 14 Pages.

(Continued)

*Primary Examiner* — Kenneth Tang
(74) *Attorney, Agent, or Firm* — Holzer Patel Drennan (57) ABSTRACT

A workload management system includes a workload management tool configured to generate a workload context associated with a workload generated based on interactions of a user with workload initiation controls presented within a user interface (UI) of a client application. The workload context includes instructions for transmitting the workload context from a main browser session to a first background browser session; executing the workload within the first background session; and for configuring a first event handler within the main session to wait for a first event generated within the first background session in association with execution of the workload and, in response to receipt of the first event, transmit the client application an instruction to present workload status information in the user interface.

20 Claims, 5 Drawing Sheets

(56) References Cited

U.S. PATENT DOCUMENTS

| | | |
|---|---|---|
| 2021/0334129 A1 | 10/2021 | Mitevski et al. |
| 2022/0012152 A1 | 1/2022 | Dines |
| 2022/0027163 A1* | 1/2022 | Tuteja .................. G06F 9/5072 |
| 2022/0150316 A1 | 5/2022 | Hall et al. |

OTHER PUBLICATIONS

Bagnasco, et al., "The ALICE Workload Management System: Status Before the Real Data Taking", In Journal of Physics: Conference Series, vol. 219, Apr. 1, 2010, 6 Pages.

International Preliminary Report on Patentability received for PCT Application No. PCT/US23/030991, Apr. 10, 2025, 11 pages.

* cited by examiner

WEB-BASED WORKLOAD MANAGEMENT WITH ASYNCHRONOUS WORKLOAD EXECUTION AND REAL-TIME USER FEEDBACK

BACKGROUND

A variety of software as a service (SAAS) platforms provide web-based tools that utilize cloud resources to support processing tasks relating to different types of customer workloads. Despite the availability of ample processing resources, a customer that interacts with one of these web-based tools may still be subjected to substantial lag times that result when the client application on the user device "waits" for completion of the workload by a web-based application server.

Some web-based tools for workload management provide the user with an option to send workloads to one or more background session(s) that operate independent of a main session that supports the flow of I/O data to and from the client application. Unlike the main session, these background sessions lack the capability of communicating directly with the client application. Thus, while sending workloads to background sessions does allow the user to continue working in the client application during workload execution, this solution is not ideal in all cases because the user is then unable to receive feedback through the client application pertaining to the status of various workloads. For example, a user may have to wait until a batch log file is available after all queued workloads have completed and then review the log file for errors.

SUMMARY

According to one implementation, a web-based method workload generation and management includes generating a workload context in response to user inputs provides to workload initiation controls presented within a user interface (UI) of a client application. The method further includes delegating, from a main session supporting communications between the client application and an application server, execution of the workload to a first background session and subsequently releasing the client application to execute other processing tasks while the workload is being executed within the first background session. In addition, the method includes configuring a first event handler within a main session to wait for a first event generated by the first background session in association with execution of the workload and to transmit a status update instruction to the client application in response to receipt of the first event, the status update instruction instructing the client application to present workload status information for the workload in the UI.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology includes a workload management architecture implemented by a web-based platform that allows a user to create and schedule workloads for execution on cloud processing resources. As used herein, a "workload" refers to collection of processing jobs that are performed collectively to accomplish a common task. A number of different web-based tools exist to support customer workload creation and management using cloud-based resources. The term "workload management tool" is used herein to refer to an application that is used to create and/or manage workloads. The herein disclosed technology pertains to workload management tools provided as web applications, stored on a remote servers, that deliver content to users over the Internet through a browser interface.

While there exist many different types of workloads that can be built and/or managed by the herein disclosed systems, one example of such a workload is a sale of a product or service that is formalized and finalized by performing a number of different processing tasks. For example, the customer service representative of a retailer may take an order from a customer (e.g., over the phone, via email, chat) and then provide relevant inputs into an online form and click "submit" to initiate a sequence of web-based processing tasks that carry out and finalize the sale. In this example, the workload may include subtasks such as checking to see if inventory is available, making a reservation on available inventory, updating inventory totals, checking a customer credit limit, decrementing the customer credit limit by the cost of the order, notifying a finance operation server of the retailer of expected incoming cash flow related to the sale, identifying and applying applicable discounts, determining tax implications based on a customer's place of residency or business, and more.

Some web-based applications include an "engine" executes within the user's browser to create data that is, in turn, sent to an associated web application server by the web browser. Other web-based applications may operate exclusively on the server side in the sense that all inputs that the user provides to the web browser are conveyed to the application server and processed by the application server rather than within the web browser. In either of the above scenarios, the user's browser creates a "session" inside of which data can be exchanged between the user's browser and an application server for the web application.

As used herein, a "session" is essentially a container that keeps track of the specific browser instance that communicates with a web server and therefore recognizes requests from the same browser. A session also supports the maintaining of state data for the associated web application among multiple interactions within the same browser instance and with a web server. The session that communicates with the user's browser is referred to herein as the "main session." In some instances, web application data may be sent to what is referred to as a "background session" (discussed further below); however, the background session does not provide outputs to the user's web browser. A separate session exits exists for every separate browser instance communicating to the web server.

A user typically interacts with a web-based application by providing inputs through a user interface presented in a browser window. When the user submits the inputs, the web browser asks an application server of the workload management tool to perform one or more tasks. The web browser "waits" until the completion of all requested tasks before ending the conversation with the application server and freeing itself to perform other processing tasks. From the user perspective, this "waiting" translates to latency in the responsiveness of the user interface in the browser window, which become unavailable for the period of time during which tasks of the workload are being executed by the application server. Depending on the nature of the workload, this period of non-responsiveness may span several seconds or minutes, until the workload is completed by the application server.

One known solution to the foregoing is to allow the user to batch workloads for later execution within a session type known as a "background session." A background session has the same characteristics and functionality of the main session except that it lacks the capability to communicate directly with the web application.

While batching workloads for background session execution allows the user to continue using the UI controls of the main user session without delay, this technique makes it difficult, if not impossible, for a user to monitor the statuses of various queued workloads and/or to timely respond to errors that may be incurred. Without real-time feedback on workload execution, the user instead waits until after the batch is complete and then retrieves a batch logfile to determine if all jobs executed as intended. In this case, the user may not become aware of errors that occurred during workload execution until sometime after the associated workload is created and initialized. Remembering to go back and review the batch logfile can be burdensome and for certain time-sensitive workload operations, the associated delays in error discovery and reaction may be unacceptable.

The herein disclosed workload management system improves upon the above types of web-based workload management applications by delegating user-submitted workloads to various background sessions while simultaneously providing a mechanism that facilitates real-time monitoring of the workloads executing in the background session(s) through feedback that is provided to and presented within a user interface of the web-based workload management application that the user interacts with to initially submit the workload. Since the workloads are executed in background sessions, the user interface of the workload management application (presented in the web browser) is not tied up during the execution of each workload; yet, at the same time, the user retains the same real-time visibility into the status of each executing workload as is currently possible when all processing operations are conducted within the main session.

Stated differently, the disclosed architecture facilitates asynchronous processing of each workload, meaning that the processing of each workload occurs independent of the activit(ies) workload management tool used to create the workloads. The particular disclosed architecture supports concurrent workload execution for a single user interacting with a browser interface as well as presentation of real-time feedback for each of the concurrently-executed workloads to a UI of workload management tool that is presented to the user through the web browser window.

Figure 1:
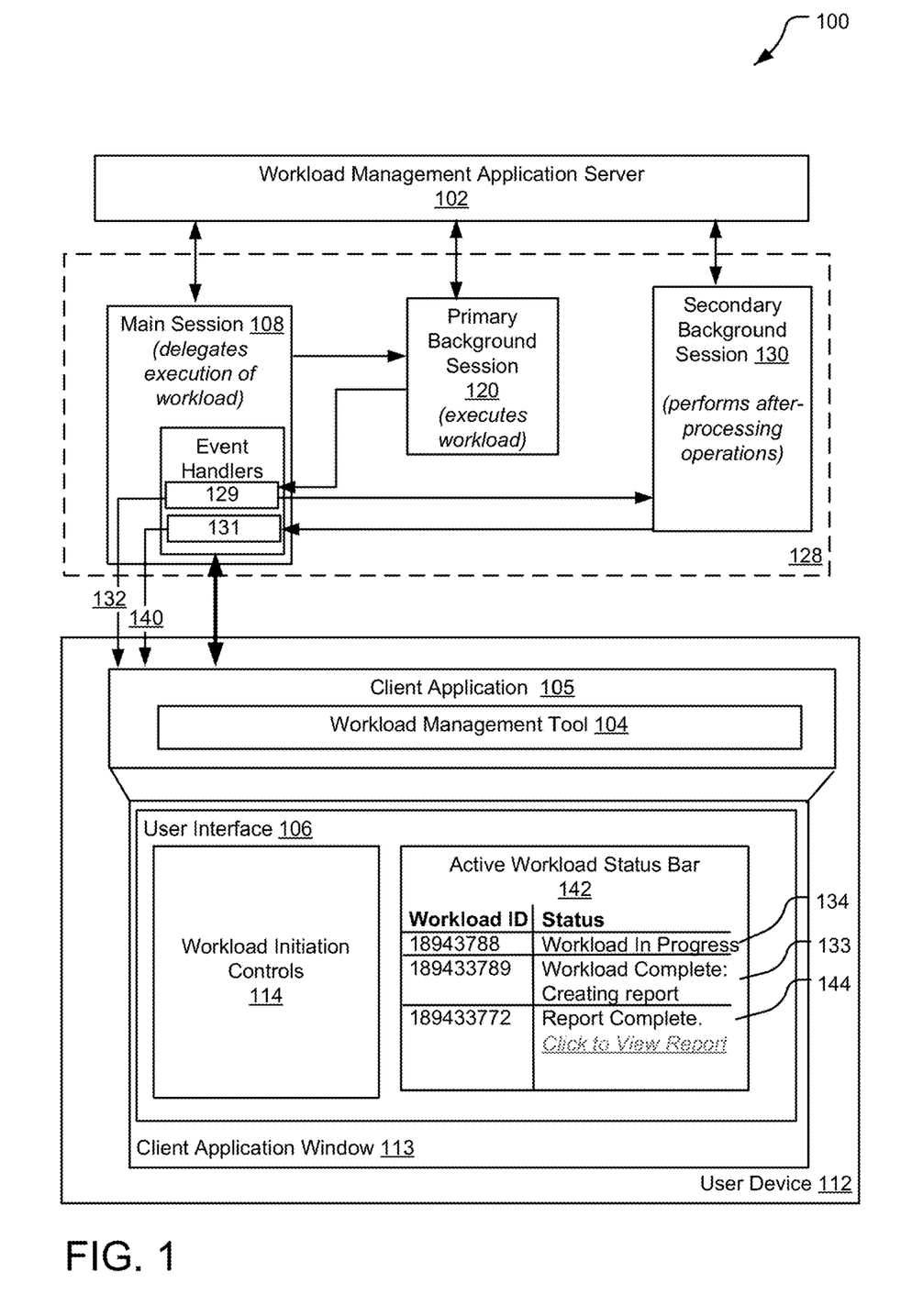
FIG. 1 illustrates an example web-based workload management system that supports asynchronous execution of user-initiated workloads with real-time feedback and monitoring through a web-based application.

FIG. 1 illustrates an example web-based workload management system 100 that supports asynchronous execution of user-initiated workloads with real-time feedback and monitoring through a web-based application. In one implementation, the web-based workload management system 100 includes software and hardware (storage and processing) resources of a software as a service (SAAS) provider. The web-based workload management system 100 includes a workload management application server 102 and a workload management tool 104 that provides a user interface 106 to facilitate communications between the user and the workload management application server 102. In FIG. 1, the workload management tool 104 is shown to reside within a client application 105 (e.g., a web browser) that executes on a user device 112. For example, the workload management tool 104 is an engine that is executed by the client application 105. In other implementations, the functionality of the workload management tool 104 is provided by the software executing on the workload management application server 102, which may be a single server or a collection of servers. In one implementation, the workload management tool 104 allows a user to construct individual workloads (e.g., to supply workload parameters and/or specify subtasks of the workload) and to submit those workloads for execution on cloud resources of the web-based workload management system 100.

The user interface 106 of the workload management tool 104 is presented within a client application window 113 controlled by the client application 105 (e.g., a web browser). The user interface 106 includes workload initiation controls 114, which may be understood as interactive graphical user interface (GUI) elements that allow a user to provide inputs for creating and initializing workloads. In one implementation, the workload initiation controls 114 remain available to the user at substantially all times (meaning that any lag in the availability of the controls is too short to be noticed by the user), even while one or more previously-created workloads of the user are being concurrently executed.

In various implementations, the nature and purpose of workload types supported by the workload management tool 104 differ widely. In one implementation, the workload management tool is used to generate and process sales submitted through a web form presented on the user interface 106. In this case, execution of each workload generated by the workload management tool 104 includes executing sub-tasks performed to fulfill all or part of a sales order, such as tasks related to posting an order (e.g., reserving certain inventory, checking available credit, accepting payment) or, alternatively, tasks related to fulfilling an order (e.g., creating a tracking number, creating a shipping label, printing the shipping label).

In another implementation, the workload management tool is a system for medical data entry. Each created workload includes sub-tasks performed to create a patient appointment for a medical procedure such as determining medical equipment needed for the procedure, identifying medical personal qualified to perform the procedure, accessing calendar(s) to determine equipment and/or personnel availability, placing appropriate reservations, and retrieving medical instructions (if applicable) for the patient to follow prior to the procedure. The above scenarios are merely exemplary of a wide class of workloads that the web-based workload management system 100 may be designed to handle.

In FIG. 1, the web-based workload management system 100 is shown to include several workload-specific components 128 (e.g., various sessions with the workload management application server and event handlers), which are representative of the software components that are invoked to perform various tasks on behalf of a single workload. When the workload management system 100 is managing multiple workloads on behalf of the user, there exist other instances of some or all of the workload-specific components 128 that support each of those other workloads. Notably, FIG. 1 is intended to convey aspects of workload creation and execution that are conducted on behalf of a single user.

The user interface 106 includes workload initiation controls 114, which may be understood as being interactive UI elements that the user can interact with to create a workload and/or submit a workload for processing. In the example where the workload management tool 104 supports sale processing, the user may interact with the workload initiation controls 114 to enter relevant sale data such as contact info for a customer, the item(s) purchased, details of the payment method, etc.

When submits a workload (e.g., a sale) by clicking a "submit" button or taking other action, a main session 108 is launched in association with that workload. The main session 108 is a processing session instantiated on a cloud-based server. The main session 108 is one of three different sessions that are created for the user to perform various operations in carrying out a single workload. As described above, these different sessions are essentially containers inside of which the workload management application server 102 executes various requested tasks. The main session 108 is the only session illustrated that is capable of receiving inputs from and providing inputs to the client application 105 (e.g., the web browser), which controls the client application window 113. If the client application 105 requests that the workload management application server 102 execute a workload inside of the main session 108, the client application 105 has to "wait" for the entire workload to complete before being "freed" for use in initiating or otherwise participating in other processing operations external to the session.

In contrast to the main session 108, FIG. 1 also illustrates two additional sessions including a primary background session 120 and a secondary background session 130, which perform different roles discussed below. In contrast to the main session 108, these background sessions cannot receive inputs from or provide outputs directly to the client application 105. Consequently, these background sessions are unable to directly interact with a user through the user interface 106. Background sessions are traditionally used to execute time-consuming tasks "in the background" without the user having to wait for the task to finish. Per these traditional applications, the user does not receive real-time outputs from processes executed within background sessions.

Since controls of the user interface 106 are rendered unavailable during periods of time in which the main session 108 is being used to execute the processing tasks requested by the client application 105, it is desirable to send time-consuming processing tasks to a background session (e.g., either the primary background session 120 or the secondary background session 130). FIG. 1 implements an architecture that allows for selective delegation of certain tasks to background session and that supports a feedback channel from those background sessions to relay related certain workload outputs and insights back to the client application 105 and ultimately, to the user interface 106 of the workload management tool 104.

In one implementation, the user provides inputs through the user interface 106 that define parameters for creating a particular type of workload. When the user submits the workload (such as by clicking a submit button or other action), the workload management tool 104 generates a bundle of computer-readable instructions and related data referred to herein as the "workload context." The workload context includes processing instructions for executing the user-requested workload as well as further execution instructions and parameters that dictate where and how each of the specified processing tasks are performed. The workload context may also specify destinations for various outputs and events generated during workload execution. In FIG. 1, the bundle of instructions also includes instructions for carrying out "after-processing operations" which are to be understood as further processing operations that analyze the results of the user-requested workload to generate additional information. This workload context is transmitted to the workload management application server 102.

Since the main session 108 provides the input/output communication channel to the client application window 113, it is the main session 108 that first receives the workload context. The main session 108 unpacks the workload context and executes a subset of its included instructions that provide for delegating certain other instructions of the workload context to the primary background session 120. The main session 108 repacks the workload context and transmits the workload context to the primary background session 120, which executes another subset of the included workload context instructions before repacking and transmitting the bundle to still other entities that perform other subsets of the instructions, as is described below.

In one implementation, the subset of the workload context instructions executed within the main session 108 includes operations that request and assign workload ID from the workload management application server 102. In one implementation, the workload ID is passed back to the workload management tool 104 in response to its creation. In one implementation, the workload ID is packaged with each communication (e.g., status message or report) that is subsequently generated and transmitted in association with the workload such that the various components of the web-based workload management system 100 are able to map the transmitted communications to their associated workload. This mapping becomes particularly important when multiple different workloads are concurrently being processed on behalf of the same user.

After the workload ID is created for the workload, the main session 108 instantiates the background session 120 and delegates execution of the user-request workload to the primary background session 120. Within the main session 108, the workload context is repacked and transmitted to the primary background session 120. Within the primary background session 120, the user-requested workload is implemented. In the example of posting a sale, the user-requested workload may include all operations that are performed to implement and finalize the sale.

In one implementation, the main session 108 transmits a status message back to the client application to confirm that the user-workload has been delegated. The client application 105, in turn, presents the corresponding status message to the user in the user interface 106 shown within the client application window 113. In FIG. 1, status messages generated for the workload are shown in an active workload status bar 142. For example, a status message 134 reads "workload in progress" and is presented in association with a corresponding workload ID.

The delegation of the workload to the primary background session 120 effectively commences a new "conversation" (e.g., a series of communications) between the client application 105 and the workload management application server 102 that occurs within in a different session storing state data independent of the main session 108. The delegation of the user-requested workload to a new session that lacks ability to communicate with the client application allows the client application (e.g., the user's web browser) to be "released" from its wait for a result from the workload. Consequently, the user interface 106 becomes available for use again as soon as this delegation occurs. At this point in time, the user can begin immediately begin creating a new workload in the user interface 106.

In one implementation, the main session 108 instructs the web instance to create another main session (not shown) in response to the "release" of the client application 105 from its wait for the workload result. In this case, the user can create a new workload using the workload initiation controls 114 of the user interface 106 and submit the workload to the newly-created main session for execution even while the main session 108 is still waiting for the results of earlier-submitted workload.

Upon receiving the workload context, the primary background session 120 performs actions that collectively effect execution of all sub-tasks of the workload itself, such as actions that entail communications with other servers, databases, etc. However, since the primary background session 120 is not associated with any terminal and lacks the ability to communicate with the client application 105, outputs generated by the primary background session 120 cannot be conveyed directly to the user interface 106. Instead, the background session creates a "completed operation event" and this event is handled by an event handler 129 of the main session.

Responsive to receipt of a "completed operation event" from the primary background session 120, the event handler 129 passes workload status information 132 (e.g., status messages) back to the client application in real-time (e.g., immediately in response to its receipt). This facilitates presentation of the workload status information 132 in the user interface 106 without tying up the user interface 106 for the duration of all processing activities of the user-requested workload.

In one implementation, outputs generated during the primary background session 120 are packaged with the applicable workload ID so the event handler 129 is able to map each communication to the associated workload that is known to the system. The event handler 129 uses the workload ID for the workload to generate and transmit UI control commands to the client application 105 using an API of the client application that affects presentation, by the client application 105, of status message(s) pertaining to the workload on the user interface. By example, FIG. 1 shows status messages 133, 134, 144 presented in an active workload status bar 142. Each status message is presented in association with the workload ID or other workload identifying information known to the user.

By example, the user interface 106 illustrates a status message 133 "Workload Complete: Creating report" that is presented within the user interface 106 when the workload has finished executing within the primary background session 120. This message is generated by the event handler 129 and sent to the client application 105 (e.g., web browser) in association with the corresponding workload ID. The status message 133 may be presented in association with the workload ID (as shown) or other workload identifying information known to the user.

Notably, the user interface 106 becomes inaccessible for the brief moment during which the event handler 129 is transmitting the workload status information 132. However, as soon as the workload event handler 129 conveys the workload status information 132 (e.g., including status message 133) to the client application, the main session 108 can again release the client application 105 and the user interface 106 for other operations that the user may wish to conduct. This ensures that the time in which the user interface 106 is rendered unavailable is so short (e.g., milliseconds or nanoseconds) that the user does not notice delay or lag in the availability of UI elements.

In some implementations, the web-based workload management system 100 may provide the user with more detailed summary information pertinent to execution of each workload (e.g., information about outputs of specific sub-tasks). This summarizing information is, for example, generated by analyzing outputs of the workload itself during a set of additional processing operations referred to herein as "after-processing operations" performed following execution of the workload. To generate this more detailed summary information without rendering the user interface 106 inaccessible during the associated processing operations, the workload event handler 129 instantiates a secondary background session 130.

The workload event handler 129 repacks the workload context along with the workload ID and the results it received that were generated during execution of the workload by the primary background session 120 and delegates execution of a set of after-processing operations (also included in the workload context) to a secondary background session 130. As used herein, "delegating execution" of a process to a "session" (e.g., a background session or main session) entails one or more actions that collectively cause the process to be executed within the session it is delegated to. For example, delegating execution of a process to a background session may entail launching a background session and sending state data over to the background session along with the executable code of the process that is to be executed in the background session.

The processing entity that actually executes the process may be external to the session and have the capability with communicating with the client application through multiple different sessions.

Within the secondary background session 130, the after-processing operations are executed on the results generated by the primary background session 120. For example, the secondary background session 130 may receive as input a logfile including system inputs and outputs generated during execution of the workload. In one implementation, the after-processing operations include operations for parsing the logfile to retrieve relevant data and/or further operations that manipulate such data to generate new "report data 140" (e.g., summary data) summarizing the workload. For example, the report data 140 summarizes the results of the workload in an easy-to-understand format, flagging errors that were observed and noting other information that is helpful to the user in correcting or troubleshooting the errors.

Since the secondary background session 130 also lacks the capability of communicating with the client application 105, the secondary background session 130 generates an "event completed operation" and another event handler 131 of the main session 108 is tasked with receiving and handling this event. In the specific example of FIG. 1, the report data 140 includes summary information pertaining to a logfile and/or other data generated in the primary background session 120, and the event handler 131 generates an instruction to present a link 144 within the user interface 106 that, when clicked by a user, initiates download and presentation of the report. In this way, the user is presented with real-time feedback that includes details of each workload executed (e.g., whether there were errors or flags that need to be addressed) as soon as such information is generated and available within the workload management system 100.

Since the secondary background session 130 does not initiate any transactions with the client application 105, the user interface 106 remains available to the user during the time in which the after-processing operations are being performed. Consequently, the user can interact with the user interface 106 during this time to create other additional workloads that are, in turn, submitted for processing in a manner consistent with that described above. In effect, these additional workloads can be executed in parallel with one another by different instances of the workload-specific components 128 that are instantiated on behalf of each individual workload.

Figure 2:
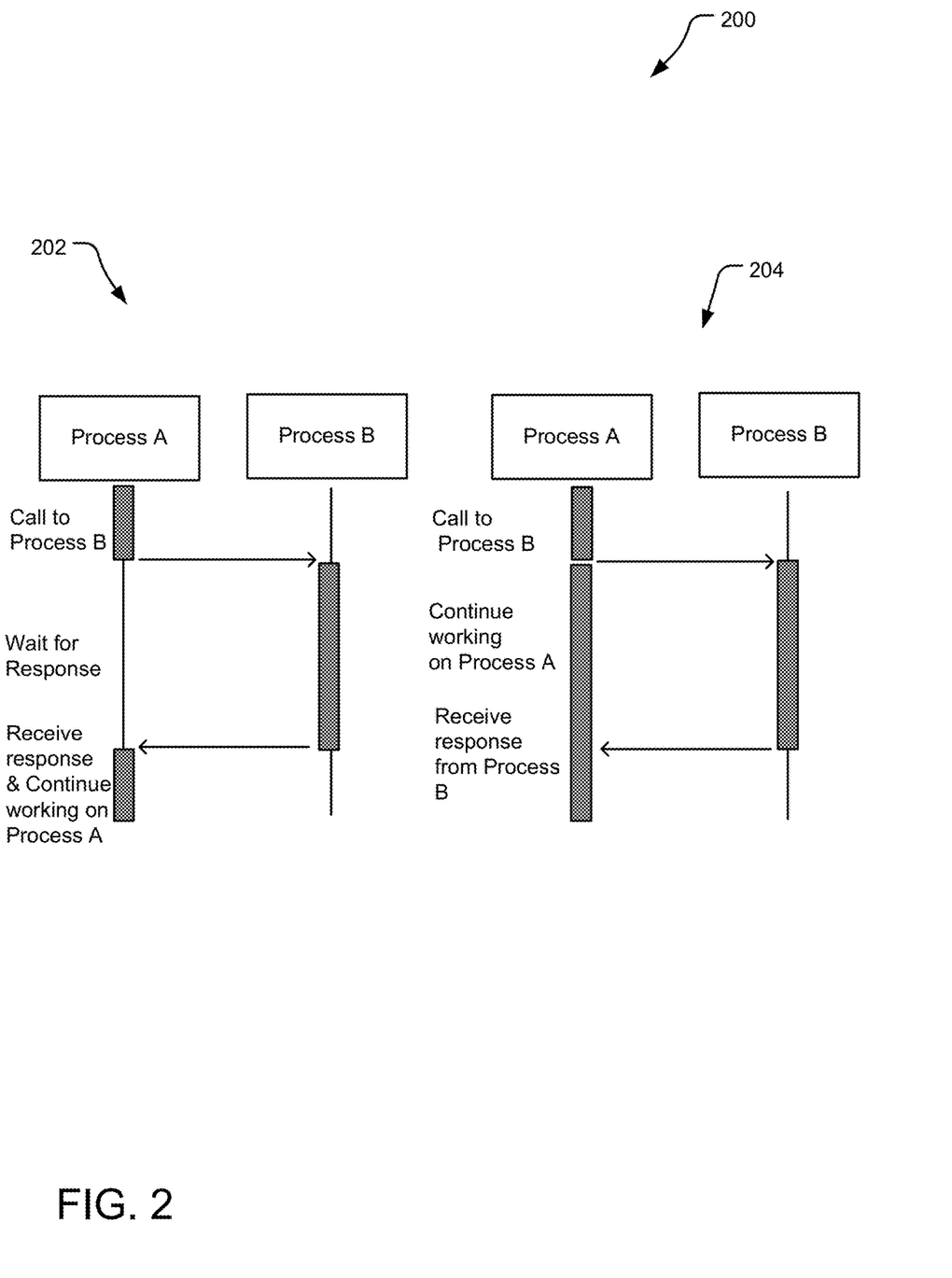
FIG. 2 illustrates an example of a synchronous processing model and of an asynchronous processing model.

To provide background context for the types of communications described in FIG. 1 that make it possible to convey background session outputs and related information to the user interface 106, FIG. 2 illustrates an example of a synchronous processing model 202 and of an asynchronous processing model 204. Synchronous processing means that a program executing a task does not execute any other task until the in-progress task in finished. For example, the synchronous processing model 202 shows that process A (e.g., a client application) communicates with process B (e.g., another server or database) and then "waits" for the response from B. Process A does not perform any tasks during the wait operation. This model is consistent with internet protocol application programing interfaces (HTTP APIs), which pass requests and responses in a synchronous fashion. Client applications sending HTTP requests typically expect a fast answer from a webservice.

As explained with respect to FIG. 1, this type of synchronous processing can be problematic because synchronous transactions typically render the client application unusable while a workload is in progress.

In contrast, the asynchronous processing model 204 allows process A (e.g., the client application) to begin executing a second task in parallel to an already in-progress task, without waiting for the in-progress task to finish. Batch processing is a processing technique frequently used to process large amounts of data asynchronously. With batch processing, large batches of data are processed at scheduled times to avoid blocking computing resources. However, as discussed with respect to FIG. 1, current batch processing models do not typically include a feedback mechanism to pass workload status information or other outputs from the background session to a user interface.

The architecture of FIG. 1 includes a combination of entities that perform different roles that collectively allow the client application to operate asynchronously relative to the execution of each user-created workload by a web-based server (e.g., similar to the asynchronous processing model 204). This functionality is realized, in part, by delegating time-consuming processing activities of the workload to background sessions that operate asynchronously relative to the client application while using the main session to handle UI communications and, in some cases, other "light" processing tasks that do not consume significant time. As a result, the synchronous transactions conducted within the main session can be time-limited so as to effectively maximizing the amount of time that the client application and its UI are available to the user.

Figure 3:
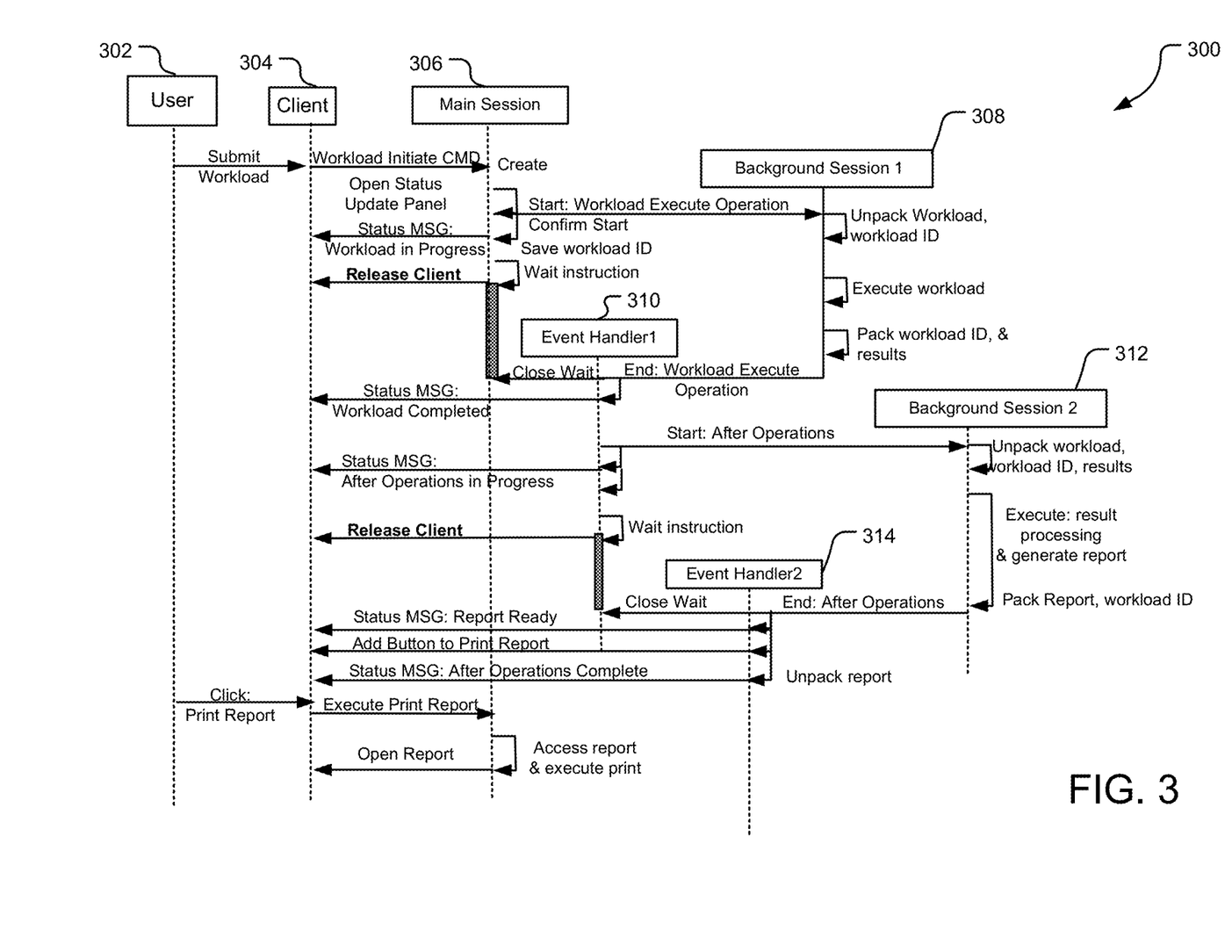
FIG. 3 illustrates a flow of communications in a workload management system that supports asynchronous workload processing while also supporting real-time process monitoring through feedback that is provided to and presented within a UI shown in a window of a client application.

FIG. 3 illustrates a flow of communications 300 in a workload management system that supports asynchronous workload processing (e.g., freeing the client application while workloads are being executed) while also supporting real-time process monitoring through feedback that is provided to and presented within a UI shown in a window of a client application.

In this flow, a user 302 provides inputs specifying parameters of workload to a user interface (UI) that is presented in a window of a client application 304 on a user device. In one implementation, the client application 304 is a web browser and the user interface elements are created either by a web application server that transmits the content to the user's web browser over the Internet or, alternatively, by a workload management tool that executes within the user's web browser and that that generates data and instructions for the web browser to transmit to a web application server in response to user inputs.

In some implementations, the user may utilize user interface controls to generate details of a workload, such as to define various sub-tasks of the workload and/or to supply parameters to be used as inputs to such sub-tasks. After defining all relevant parameters for creation of a workload, the user may submit the workload for processing, such as by clicking a submit button or by providing other input. In implementations where the workload management tool executes inside of the client application 304 (e.g., inside of a web browser), the workload management tool creates a workload context based on the user-provided inputs. Consistent with the description of FIG. 1, the workload context may be understood as including a set of processing operations executable to complete the workload created by the user (e.g., the "user-requested workload"), an additional set of "after-processing operations" that depends upon outputs generated during execution of the primary tasks of the workload, and various other processing instructions that provide for delegation of various processing tasks, specify output destinations, and/or that otherwise generally support I/O operations to provide to feedback to the user interface in association with completion of various processing tasks.

In implementations where all aspects of the workload management system are performed server-side (e.g., there is no workload management tool executed by the user's web browser), the client application 304 transmits user inputs provided to the user interface to a web application server that creates the workload context.

Notably, FIG. 3 illustrates three sessions (a main session 306, a primary background session 308, and a secondary background session 312) that are, for simplicity, shown and described as performing various workload processing operations. Notably, these referenced workload processing operations s are, in actuality, performed by an application server of a workload management system and the below references to these workload processing operations as being performed by a given session is intended to merely identify which session the application server is communicating with when each operation is executed. As described elsewhere herein, the sessions can be understood as independent (state-preserving) containers inside of which the web-based application server can perform the various operations.

The main session 306 unpacks the workload context and executes a first subset of the instructions within the workload context that generally provide for (1) creating a workload ID; (2) repackaging the workload along with the workload id; (3) transmitting the packaged workload context and workload ID to the primary background session 308; (4) delegating certain tasks within the workload to primary background session 308 in association with the workload ID; and (5) delegating certain tasks within the workload to an event handler 310. In FIG. 3, the primary background session 308 is shown as transmitting a confirmation response back to the main session 306 responsive to receiving the workload context. At this time, the primary background session 308 begins unpacking the workload context and executing the portion of tasks within the workload context that correspond to the user-requested workload.

Upon receipt of the confirmation message from the primary background session 308 confirming initiation of the workload context, the main session 306 sends the client application 304 an instruction to present a status message "workload in progress" in window that includes the user interface that the user interacted with to submit the workload. This message is transmitted in association with the workload ID that has been created for the workload. It is assumed, in FIG. 3, that the client application 306 has access to a master list of workload IDs created for various workloads being executed on behalf of the user. The workload ID provides the client application 306 with a way of uniquely identifying the workload and of mapping future incoming communications that reference the workload ID to the workload.

After the "workload in progress" message is sent, the main session 306 delegates a "wait" instruction to an event handler 310. In one implementation, the event handler 310 is a processing entity instantiated within the main session 306. The event handler 310 is tasked with waiting for completion of the workload and for receiving outputs from the primary background session 308. It is the delegation of this "wait" to the event handler 310 that effectively allows the main session 306 to release the client application 304 from a "conversation" that was initiated when the client application 304 initially transmitted the packaged workload application server within the main session 306. At this point in time, the client application 304 is released from the ongoing processing actions of the workload in the sense that all UI controls presented by the client application 304 are now available to the user, and the client application 304 can execute other processing operations.

In one implementation, the main session 306 additionally instructs the web instance to create another main session (not shown) at or near the time that the main session 306 delegates the "wait" to the event handler 310. In this case, the user can create and submit a new workload for execution to the newly-created main session, even while the main session 306 is still tied up waiting for event handler 310 to close the illustrated "wait" upon receiving the results of the workload from the primary background session 308.

In the above manner, a user may interact with the user interface of the workload management tool to create and submit other workloads that may, upon submission to respective different instances of the main session 306, begin executing in parallel with the currently-executing workload per another sequence of operations the same or similar to that illustrated in FIG. 3 (e.g., with different parallel instances of the main session 306, primary background session 308, secondary background session 312, and event handlers 310, 314).

Once the primary background session 308 has finished executing the primary tasks of the workload (e.g., the processing activities that effect a primary goal or task of the workload, such as posting a sale), the primary background session 308 repackages the workload context along with results of the processing activities performed by the primary background session 308. For example, the results may include a log file generated within the primary background session 308 during execution of the user-requested workload. This packaged data is transmitted back to the first event handler 310 that, in turn, closes the wait operation.

The event handler 310 then performs further tasks that include (1) sending a status message to the client application "workload completed"; (2) transmitting the packaged data (e.g., workload context and results) received from the primary background session 308 to the secondary background session 312; and (3) instructing the secondary background session 312 to begin executing a group of "after-processing operations" included within the workload context. Upon receipt of the packaged data, the secondary background session 312 unpacks the workload context and begins executing the after-processing operations. In one implementation, executing the "after-processing operations" include analyzing and/or manipulating (performing further operations on) results generated by the primary background session 308 to generate a report that summarizes the results.

While the secondary background session 312 is executing the after-processing operations, the event handler 310 transmits another status message "after-operations in progress" to the client application 304. This message, like all other communications pertaining to the workload, is transmitted in association with the workload ID so the client application 304 is able to identify which workload the message pertains to. At this point in time, the event handler 310 delegates a wait instruction to another event handler 314 of the main session, which causes the event handler 314 to "wait" for an end operation event that is generated by the secondary background session 312. This delegated wait instruction effectively releases the client application 304 from the conversation that was initiated when the event handler 310 sent the status message "workload completed." As such, the client application 304 is again made available to the user for the remaining time in which the after-operations are being executed.

After the secondary background session 312 finishes executing the after operations, the secondary background session 312 repackages the workload context along with a newly-generated report. At this point in time, the secondary background session 312 transmits the end operation event to the event handler 314 which, in turn, closes the wait operation with the first event handler 310, unpacks the report, and saves the report in a location accessible through the main session 306 where it can be subsequently accessed in association with the corresponding workload ID. The event handler 314 then transmits a first instruction that instructs the client application 304 to presenting a status message indicating that the report is ready to print and a second instruction that causes the client application 304 to add a button to the UI presented in the window of the client application 304 that, when clicked, allows a user to "print" (e.g., display) the report.

Notably, the operations of FIG. 3 are exemplary of how the disclosed architecture could be utilized to facilitate parallel processing of multiple workloads initiated through a UI of a client application while providing real-time feedback in association with each concurrently-executing workload to the user through the UI of the client application. Key steps in this flow include delegating the above-described "wait" operations to event handlers 310, 314 to allow the client application 304 to be released from the corresponding synchronous transactions in which the client application 304 is provided with various status messages to render to the UI while the time time-consuming processing operations of the workload are still ongoing (e.g., the primary tasks of the workload and the after-processing operations performed on the workload results).

Figure 4:
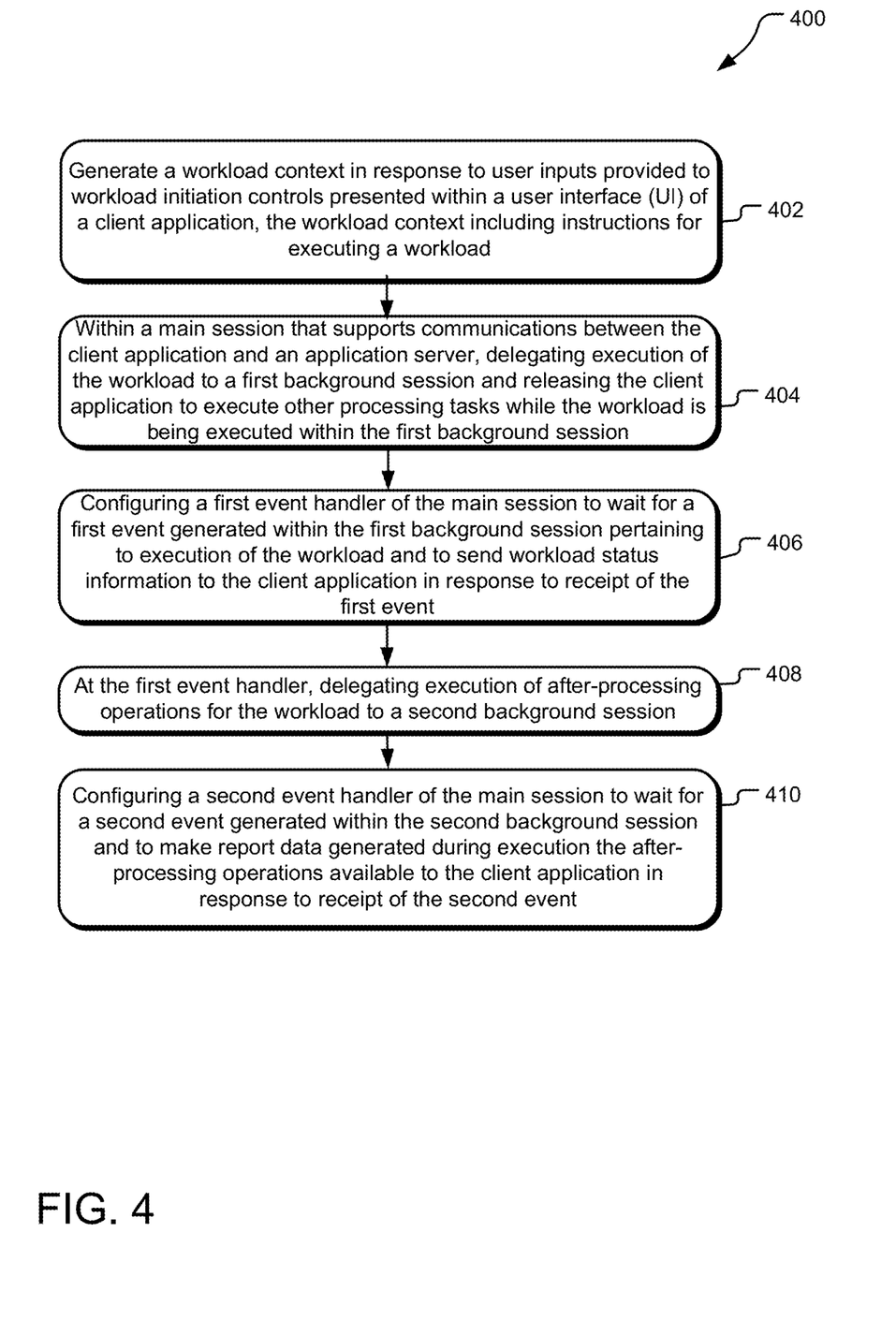
FIG. 4 illustrates example operations for workload management that support asynchronous execution of user-initiated workloads relative to a client application while providing feedback to the client application that allows a user to monitor workload execution in real-time.

FIG. 4 illustrates example operations 400 for workload management that support asynchronous execution of user-initiated workloads relative to a client application while providing feedback to the client application that allows a user to monitor workload execution in real-time.

A workload generation operation 402 generates a workload context in response to user inputs provided to workload initiation controls presented within a user interface (UI) of client application. The workload context includes instructions for executing a workload along with other processing instructions that dictate where and how the workload is to be executed.

A delegation and release operation 404 delegates execution of the workload to a first background session and releases the client application from a series of transactions being conducted within a main that supports communications between the client application and the application server. In one implementation, the delegation operation entails subtasks such as instantiating the first background session and transmitting all or a portion of the workload context to the first background session. Releasing the client application allows the client application to execute other processing operations while the workload is executing in the first background session.

A configuration operation 406 configures a first event handler of the main session to wait for a first event generated within the first background session that pertains to execution of the workload and to send workload status information to the client application in response to receipt of the first event. For example, the first event may be an "end operation event" indicating that the workload has finished executing. In this example, the workload status information may include a message indicating that the workload execution is complete and/or other information pertaining to the execution of the workload. The workload status information is, in one implementation, presented in the UI by the client application alongside status information for other concurrently-executing workloads.

Another delegation operation 408 delegates execution of after-processing operations for the workload to a second background session. In one implementation, the after-processing operations provide for analyzing and/or generating new data based on a result of the workload (e.g., a logfile) generated within the first background session.

Another configuration operation 410 configures a second event handler of the main session to wait for a second event generated within the second background session and to make report data generated during execution of the after-processing operations available to the client application in response to receipt of the second event. Actions to make the report data available to the client application may, for example, include unpacking the report data from a bundle of data received from the second background session in association with the second event and saving the report data to a location where it can be easily accessed upon request by the client application. In one implementation, the configuration operation 410 further includes configuring the second event handler to send the client application a UI presentation instruction when the second event handler receives the second event from the second background session. When executed by the client application, the UI presentation instruction updates the user interface to display a visual indication that the report data is available and/or to display a link or button that the user can interact with to access the report data. In this way, the user interacting with the UI is notified of the availability of the report data and/or presented with interactive UI elements for quickly displaying the report data as soon as such data is made available to the client application.

Figure 5:
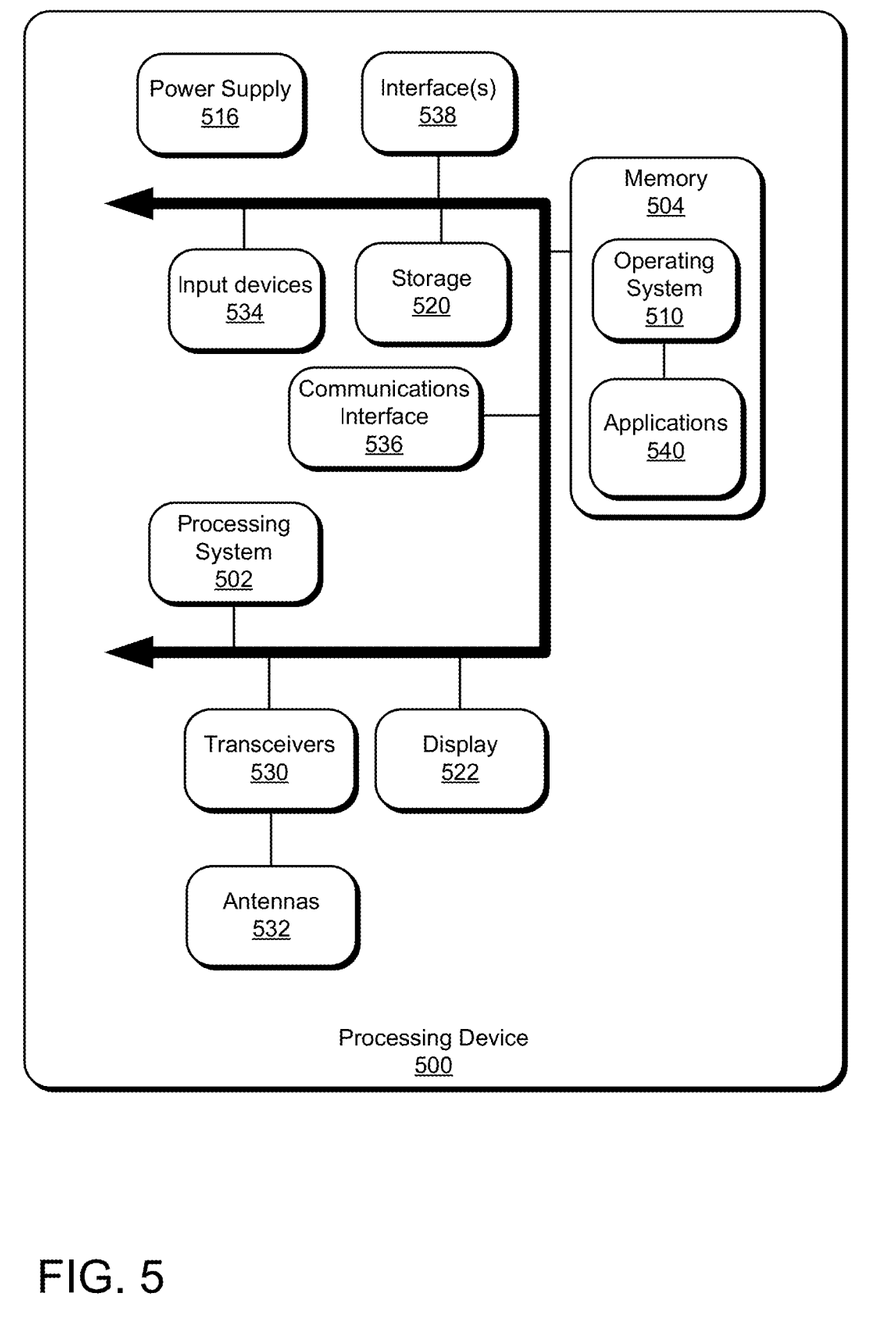
FIG. 5 illustrates an example schematic of a processing device suitable for implementing aspects of the disclosed technology.

FIG. 5 illustrates an example schematic of a processing device 500 suitable for implementing aspects of the disclosed technology. In one implementation, the processing device 500 is a user device that executes a client application (e.g., web browser) and that presents a user interface of a web-based workload management system. In another implementation, the processing device 500 is an application server of the workload management system that performs processing operations specified within a workload context generated by a tool (e.g., a workload management tool) that is executed by a browser on a user device.

The processing device 500 includes a processing system 502, memory device(s) 504, the display 506, and other interfaces 508 (e.g., buttons). The memory device(s) 504 generally includes both volatile memory (e.g., RAM) and non-volatile memory (e.g., flash memory). An operating system 510 may reside in the memory device(s) 504 and be executed by the processing system 502. One or more applications 512, such as a workload management tool (e.g., the workload management tool 104) or various applications run by a workload management application may be loaded in the memory and executed on the operating system 510 by the processing system 502.

The processing device 500 includes a power supply 516, which is powered by one or more batteries or other power sources and which provides power to other components of the processing device 500.

Additionally, the processing device 500 includes one or more communication transceivers 530 and an antenna 532 to provide network connectivity (e.g., a mobile phone network, Wi-Fi®, BlueTooth®). The processing device 500 may be further coupled to various input devices 534 such as a microphone, keyboard, touch display, etc. In an implementation, an installation script generation engine, along with other various applications and other modules and services, are embodied by instructions stored in memory device(s) 504 and/or storage devices 528 and processed by the processing system 502. The memory device(s) 504 may be memory of host device or of an accessory that couples to a host. The installation script generation engine my include a trained multi-layer neural network that is saved in the memory device(s) 504 or saved in memory of one or more other compute devices (e.g., various interconnected processing nodes) that are communicatively coupled to the processing device 500, such as via the internet.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The following summary provides a non-exhaustive set of illustrative examples of the technology set forth herein. According to a first aspect, some implementations include a method for workload creation and management. The method includes generating a workload context that includes instructions for executing a workload. The workload context is generated based on interactions of a user with workload initiation controls presented within a user interface (UI) of a client application. The method further includes performing, within a main session that supports communications between the client application and an application server, a subset of operations specified within the workload context. The subset of operations includes delegating execution of the workload to a first background session; releasing the client application to execute other processing tasks while the workload is being executed within the first background session; instantiating a first event handler within the main session that is configured to wait for a first event generated by the first background session in association with execution of the workload and transmit a status update instruction to the client application in response to receipt of the first event, the status update instruction instructing the client application to present workload status information for the workload in the UI.

The method of A1 is advantageous because it provides a user with a web-based tool for workload creation that remains available to use (e.g., to create additional workloads) even while the last-submitted workload is still executing.

(A2) In some implementations of A1, the status update instruction instructs the client application to present workload status information for the workload in the UI alongside workload status information associated with other concurrently executing workloads initiated by the user.

(A3) In some implementations of A1 and A2, delegating execution of after-processing operations for the workload to a second background session, the after-processing operations executable to generate report data for the workload based on results generated during execution of the workload within the first background session; and instantiating a second event handler in the main session, the second event handler being configured to receive second event generated within the second background session and to make report data generated by the after-processing operations available to the client application in response to receipt of the second event.

The methods of A2 and A3 are advantageous because they allows the user to be presented with real-time status information about a workload that has executed in a background session lacking direct communication to the UI of the application used to create the workload.

(A4) In some implementations of A1-A3, delegating execution of the after-processing operations further comprises executing, at the first event handler, an instruction included within the workload context that effects transmission the workload context to the second background session. The method of A4 is advantageous because the use of the first event handler to wait for and transmit the workload context to the second background session allows the client application to be free of the need to perform such actions and therefore available to the user throughout the time period that such actions are being performed.

(A5) In some implementations of A1-A4, the workload status information for the workload is presented alongside status information for other workloads initiated by the user while the other workloads are being concurrently executed by other background sessions. The method of A5 is advantageous because it provides a user with status information for multiple workloads concurrently executing in background sessions that lack a means for direct communication with the UI.

(A6) In some implementations of A1-A5, the workload is one of multiple workloads created by the user and the method further includes assigning a workload ID to each of the multiple workloads. The workload ID is a unique identifier that is passed to the client application along with the workload status information for each of the multiple workloads. The method of A6 is advantageous because it provides all processing entities in the system with a mechanism for mapping workloads to corresponding actions and status updates, therefore allowing the user to be presented with coherent information pertaining to the status of the multiple workloads even if some of those workloads are executing concurrently.

(A7) In some implementations of A1-A6 the second event handler is further configured to instruct the client application to present a UI element that, when interacted with by a user, triggers presentation of the report data for the workload within a window of the client application. This is advantageous because it allows the user to view a report pertaining to a workload executed in a background session as soon as the report becomes available.

(A8) In some implementations of A1-A7, the workload initiation controls of the client application remain operational and accessible to the user while the workload is executing. This is advantageous because it allows the user to continue to create and submit additional workloads for execution without "waiting" for the in-progress workload to finish.

In another aspect, some implementations include a computing system for workload creation and management. The computing system includes hardware logic circuitry that is configured to perform any of the methods described herein (e.g., methods A1-A9).

In yet another aspect, some implementations include a computer-readable storage medium for storing computer-readable instructions. The computer-readable instructions, when executed by one or more hardware processors, perform any of the methods described herein (e.g., methods A1-A9).

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A workload management system comprising:
 a workload management tool stored in memory and executed by one or more processors, the workload management tool being configured to generate a workload context associated with a workload generated based on interactions of a user with workload initiation controls presented within a user interface (UI) of a client application, the workload context including instructions for:
  transmitting the workload context from a main session to a first background session, the main session supporting communications between the client application and an application server;
  executing the workload within the first background session;
  configuring a first event handler and a second event handler within the main session, the first event handler configured to:
   wait for a workload completion event generated within the first background session in association with execution of the workload and remain passively suspended until the workload completion event is received;
   in response to receiving the workload completion event, transmit the client application an instruction to present workload status information in the user interface, the workload initiation controls of the user interface remaining operational and accessible to the user during the execution of the workload;
   transmit workload results generated within the first background session to a second background session along with an instruction to execute after-processing operations on the workload results to generate report data;
   delegate a wait instruction to the second event handler, the wait instruction causing the second event handler to remain passively suspended while awaiting the report data generated within the second background session and, upon receiving report data generated by the second background session, make the report data available to the client application.

2. The workload management system of claim 1, wherein the report data generated within the second background session summarizes the workload results and identifies any errors observed during execution of the workload.

3. The workload management system of claim 2, wherein configuring the first event handler further comprises:
 configuring the first event handler to transmit the workload context to the second background session in response to receiving the workload completion event from the first background session.

4. The workload management system of claim 2, wherein the workload context further includes instructions for configuring the second event handler of the main session to:
 wait for and receive an end operation event generated by the second background session; and
 make the report data generated by the after-processing operations available to the client application in response to receiving the end operation event.

5. The workload management system of claim 4, wherein the second event handler makes the report data available to the client application by saving the report data in a location accessible through the main session, and wherein the second event handler instructs the client application to present a UI element, and wherein a user interaction with the UI element triggers presentation of a report for the workload within the user interface.

6. The workload management system of claim 1, wherein the instruction to present the workload status information is an instruction to present the workload status information in the user interface alongside workload status information for other concurrently-executing workloads.

7. The workload management system of claim 1, wherein the workload context further includes instructions for assigning a workload ID to the workload, the workload ID being a unique identifier that is passed to the client application along with the workload status information for the workload.

8. A method comprising:
generating a workload context based on interactions of a user with workload initiation controls presented within a user interface (UI) of a client application, the workload context including instructions for executing a workload;
within a main session that supports communications between the client application and an application server, performing a subset of operations specified within the workload context, the subset of operations including:
delegating execution of the workload to a first background session and releasing the client application to execute other processing tasks while the workload is being executed within the first background session;
instantiating a first event handler and a second event handler within the main session, the first event handler being configured to:
wait for a workload completion event generated by the first background session in association with execution of the workload and remain passively suspended until the workload completion event is received; and
transmit a status update instruction to the client application in response to receipt of the workload completion event, the status update instruction instructing the client application to present workload status information for the workload in the UI;
transmit workload results generated within the first background session to a second background session along with an instruction to execute after-processing operations on the workload results and thereby generate report data; and
delegate a wait instruction to the second event handler, the wait instruction causing the second event handler to remain passively suspended while awaiting the report data generated within the second background session and, upon receiving report data generated by the second background session, make the report data available to the client application.

9. The method of claim 8, wherein the status update instruction instructs the client application to present workload status information for the workload in the UI alongside workload status information associated with other concurrently executing workloads initiated by the user.

10. The method of claim 8, wherein the report data generated within the second background session summarizes the workload results and identifies any errors observed during execution of the workload.

11. The method of claim 9, wherein delegating execution of the after-processing operations further comprises:
at the first event handler, executing an instruction included within the workload context that effects transmission the workload context to the second background session.

12. The method of claim 10, wherein the workload status information for the workload is presented alongside status information for other workloads initiated by the user while the other workloads are being concurrently executed by other background sessions.

13. The method of claim 10, wherein the workload is one of multiple workloads created by the user and wherein the method further includes:
assigning a workload ID to each of the multiple workloads, the workload ID being a unique identifier that is passed to the client application along with the workload status information for each of the multiple workloads.

14. The method of claim 10, wherein the second event handler makes the report data available to the client application by saving the report data in a location accessible through the main session and wherein the second event handler is further configured to instruct the client application to present a UI element that, when interacted with by a user, triggers presentation of the report data for the workload within a window of the client application.

15. The method of claim 8, wherein the workload initiation controls of the client application remain operational and accessible to the user while the workload is executing.

16. One or more tangible computer-readable storage media encoding computer-executable instructions for executing a computer process, the computer process comprising:
receiving a workload context including instructions for executing a workload created based on interactions of a user with workload initiation controls presented within a user interface (UI) of a client application;
within a main session that supports communications between the client application and an application server, performing a subset of operations specified within the workload context, the subset of operations including:
delegating execution of the workload to a first background session and releasing the client application to execute other processing tasks while the workload is being executed within the first background session; and
configuring a first event handler and a second event handler within the main session, the first event handler configured to:
receive a first event generated within the first background session, the first event pertaining to execution of the workload and remain passively suspended until the first event is receive from the first background session;
in response to receipt of the first event, instruct the client application to present workload status information in the UI alongside the workload initiation controls, the workload initiation controls remaining operational and accessible by the user while the workload is executing;
transmit workload results generated within the first background session to a second background session along with an instruction to execute after-processing operations on the workload results to generate report data;
delegate a wait instruction to the second event handler, the wait instruction causing the second event handler to remain passively suspended while awaiting the report data generated within the second background session and, upon receiving report data generated by the second background session, make the report data available to the client application.

17. The one or more tangible computer-readable storage media of claim 16, wherein the second event handler makes the report data available to the client application by saving the report data in a location accessible through the main session, and wherein the second event handler instructs the client application to present a UI element.

18. The one or more tangible computer-readable storage media of claim 17, wherein delegating execution of the after-processing operations further includes:
transmitting the workload context from the first event handler of the main session to the second background session.

19. The one or more tangible computer-readable storage media of claim 17, wherein the report data summarizes the workload results generated during execution of the workload within the first background session.

20. The workload management system of claim 1, wherein the first event handler instructs the client application to present the workload status information in the user interface alongside workload status information for other concurrently-executing workloads.

* * * * *